United States Patent
Courchaine et al.

(10) Patent No.: US 10,268,011 B2
(45) Date of Patent: *Apr. 23, 2019

(54) OPTICAL CONNECTION TERMINALS FOR FIBER OPTIC COMMUNICATIONS NETWORKS

(71) Applicant: AFL Telecommunications LLC, Duncan, SC (US)

(72) Inventors: Wilfred Courchaine, Moore, SC (US); Brett Villiger, Simpsonville, SC (US); Joseph Cignarale, Greer, SC (US); Shirley Ball, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,886

(22) Filed: Apr. 13, 2018

(65) Prior Publication Data
US 2018/0306994 A1 Oct. 25, 2018

Related U.S. Application Data

(63) Continuation of application No. 15/493,861, filed on Apr. 21, 2017, now Pat. No. 9,977,211.

(51) Int. Cl.
*G02B 6/38* (2006.01)
*G02B 6/44* (2006.01)
*G02B 6/48* (2006.01)

(52) U.S. Cl.
CPC ......... *G02B 6/4446* (2013.01); *G02B 6/3894* (2013.01); *G02B 6/3897* (2013.01);
(Continued)

(58) Field of Classification Search
CPC .................................................. G02B 6/4446
See application file for complete search history.

(56) References Cited

U.S. PATENT DOCUMENTS 5,042,901 A 8/1991 Merriken et al.
5,073,044 A 12/1991 Egner et al.
(Continued)

FOREIGN PATENT DOCUMENTS

EP 0481954 A1 4/1992
EP 0505104 A1 9/1992
(Continued)

OTHER PUBLICATIONS

AFL Telecommunications LLC; International Patent Application No. PCT/US2016/013053; International Search Report; dated Mar. 4, 2016; (1 page).
(Continued)

*Primary Examiner* — Rhonda S Peace
(74) *Attorney, Agent, or Firm* — Dority & Manning, P.A.

(57) ABSTRACT

An optical connection terminal assembly for a fiber optic communications network includes an optical connection terminal. The terminal includes a base, the base including an exterior wall, and a cover connected to the base wherein an interior cavity is defined between the base and the cover. The terminal further includes an all-dielectric self-supporting ("ADSS") cable port defined in the cover, and a plurality of connector ports defined in the exterior wall of the base. The terminal assembly further includes an ADSS cable connector including a main body and a connector body, the ADSS cable connector positionable such that the connector body extends through the ADSS cable port into the interior cavity. The terminal assembly further includes an ADSS cable connected to the cable connector, wherein optical fibers of the ADSS cable extend through the ADSS cable connector and through the ADSS cable port into the interior cavity.

23 Claims, 12 Drawing Sheets

(52) U.S. Cl.
CPC ......... *G02B 6/4441* (2013.01); *G02B 6/4444* (2013.01); *G02B 6/4471* (2013.01); *G02B 6/483* (2013.01)

(56) References Cited

U.S. PATENT DOCUMENTS

| | | | |
|---|---|---|---|
| 5,115,105 A | 5/1992 | Gallusser et al. | |
| 5,121,458 A | 6/1992 | Nilsson et al. | |
| 5,125,060 A | 6/1992 | Edmundson | |
| 5,133,038 A | 6/1992 | Zipper | |
| 5,133,039 A | 6/1992 | Dixit | |
| 5,247,135 A | 9/1993 | Rebers et al. | |
| 5,267,122 A | 11/1993 | Glover et al. | |
| 5,440,665 A | 8/1995 | Ray | |
| 5,495,549 A | 2/1996 | Schneider et al. | |
| 5,509,099 A | 4/1996 | Hermsen et al. | |
| 5,528,718 A | 6/1996 | Ray et al. | |
| 5,636,310 A | 6/1997 | Walles | |
| 5,778,122 A | 7/1998 | Giebel et al. | |
| 5,812,728 A | 9/1998 | Wanamaker | |
| 5,828,807 A | 10/1998 | Tucker et al. | |
| 5,892,870 A | 4/1999 | Fingler et al. | |
| 6,061,492 A | 5/2000 | Strause et al. | |
| 6,152,767 A | 11/2000 | Roosen et al. | |
| 6,292,614 B1 | 9/2001 | Smith et al. | |
| 6,427,035 B1 | 7/2002 | Mahony | |
| 6,493,500 B1 | 12/2002 | Oh et al. | |
| 6,579,014 B2 | 6/2003 | Melton et al. | |
| 6,614,980 B1 | 9/2003 | Mahony | |
| 6,621,975 B2 | 9/2003 | Laporte et al. | |
| 6,695,486 B1 | 2/2004 | Falkenberg | |
| 6,766,094 B2 | 7/2004 | Smith et al. | |
| 6,777,617 B2 | 8/2004 | Berglund et al. | |
| 6,798,967 B2 | 9/2004 | Battey et al. | |
| 6,819,842 B1 | 11/2004 | Vogel et al. | |
| 6,856,748 B1 | 2/2005 | Elkins, II et al. | |
| 6,926,449 B1 | 7/2005 | Keenum | |
| 7,006,739 B2 | 2/2006 | Elkins, II et al. | |
| 7,013,074 B2 | 3/2006 | Battey et al. | |
| 7,120,347 B2 | 10/2006 | Blackwell, Jr. et al. | |
| 7,137,742 B2 | 11/2006 | Theuerkorn et al. | |
| 7,228,036 B2 | 6/2007 | Elkins, II et al. | |
| 7,244,066 B2 | 7/2007 | Theuerkorn | |
| 7,264,402 B2 | 9/2007 | Theuerkorn et al. | |
| 7,292,763 B2 | 10/2007 | Smith | |
| 7,302,152 B2 * | 11/2007 | Luther | G02B 6/4441 385/100 |
| 7,333,708 B2 | 2/2008 | Blackwell, Jr. et al. | |
| 7,340,144 B2 * | 3/2008 | Dobbins | G02B 6/445 385/134 |
| 7,346,253 B2 | 3/2008 | Bloodworth et al. | |
| 7,356,237 B2 | 4/2008 | Mullaney et al. | |
| RE40,358 E | 6/2008 | Thompson et al. | |
| 7,394,964 B2 | 7/2008 | Tinucci et al. | |
| 7,397,997 B2 | 7/2008 | Ferris et al. | |
| 7,444,056 B2 | 10/2008 | Allen et al. | |
| 7,477,824 B2 | 1/2009 | Reagan | |
| 7,480,437 B2 | 1/2009 | Ferris et al. | |
| 7,512,304 B2 | 3/2009 | Gronvall | |
| 7,539,387 B2 | 5/2009 | Mertesdorf et al. | |
| 7,558,458 B2 | 6/2009 | Gronvall | |
| 7,653,282 B2 | 1/2010 | Blackwell, Jr. et al. | |
| 7,740,409 B2 | 6/2010 | Bolton | |
| 7,753,596 B2 | 7/2010 | Cox | |
| RE41,777 E | 9/2010 | Thompson et al. | |
| 7,844,158 B2 | 11/2010 | Gronvall | |
| RE42,258 E | 3/2011 | Thompson et al. | |
| 8,001,686 B2 * | 8/2011 | Swindell | G02B 6/483 29/868 |
| RE43,762 E | 10/2012 | Smith et al. | |
| 8,363,999 B2 | 1/2013 | Mertesdorf et al. | |
| 8,740,477 B2 | 5/2014 | Tamura | |
| 8,774,585 B2 | 6/2014 | Kowalczyk | |
| 8,913,864 B2 * | 12/2014 | Reeve | G02B 6/4467 385/109 |
| 9,069,151 B2 | 6/2015 | Conner | |
| 9,081,161 B2 * | 7/2015 | Dobbins | G02B 6/44 |
| 9,389,369 B2 | 6/2016 | Isenhour | |
| 9,417,420 B2 * | 8/2016 | Fisher | G02B 6/4477 |
| 9,606,320 B2 | 3/2017 | Wang | |
| 9,742,176 B2 | 8/2017 | Wang | |
| 9,780,548 B1 * | 10/2017 | Kranz | F16L 3/1075 |
| 9,857,537 B2 | 1/2018 | Wang | |
| 9,958,627 B2 * | 5/2018 | Cignarale | G02B 6/4403 |
| 9,977,211 B1 * | 5/2018 | Courchaine | G02B 6/4446 |
| 2002/0150371 A1 | 10/2002 | Battey et al. | |
| 2005/0163448 A1 | 7/2005 | Blackwell, Jr. et al. | |
| 2005/0213921 A1 | 9/2005 | Mertesdorf et al. | |
| 2005/0281510 A1 | 12/2005 | Vo | |
| 2006/0093303 A1 | 5/2006 | Reagan | |
| 2006/0147172 A1 | 7/2006 | Luther | |
| 2006/0269208 A1 | 11/2006 | Allen | |
| 2006/0285811 A1 | 12/2006 | Kowalczyk | |
| 2008/0152293 A1 | 6/2008 | Knecht | |
| 2009/0074369 A1 | 3/2009 | Bolton et al. | |
| 2009/0226181 A1 | 9/2009 | Fingler | |
| 2009/0238520 A1 | 9/2009 | Wouters | |
| 2009/0317047 A1 | 12/2009 | Smith | |
| 2013/0022328 A1 | 1/2013 | Gronvall et al. | |
| 2013/0108227 A1 | 5/2013 | Conner | |
| 2013/0114930 A1 | 5/2013 | Smith | |
| 2013/0146355 A1 | 6/2013 | Strasser | |
| 2014/0099061 A1 | 4/2014 | Isenhour | |
| 2017/0160489 A1 | 6/2017 | Wang | |

FOREIGN PATENT DOCUMENTS

| | | |
|---|---|---|
| JP | S58105114 A | 6/1983 |
| JP | 2003177254 A | 6/2003 |
| WO | WO2016/115137 A1 | 7/2016 |

OTHER PUBLICATIONS

AFL Telecommunications LLC; International Patent Application No. PCT/US2016/061334; International Search Report; dated Jan. 23, 2017; (1 page).

Multilink Inc.; Multilink Innovation at Work Installation Instructions for Fiber Tap Model Codes FT-8D-965-032-10 Revision 1; 2014.

* cited by examiner

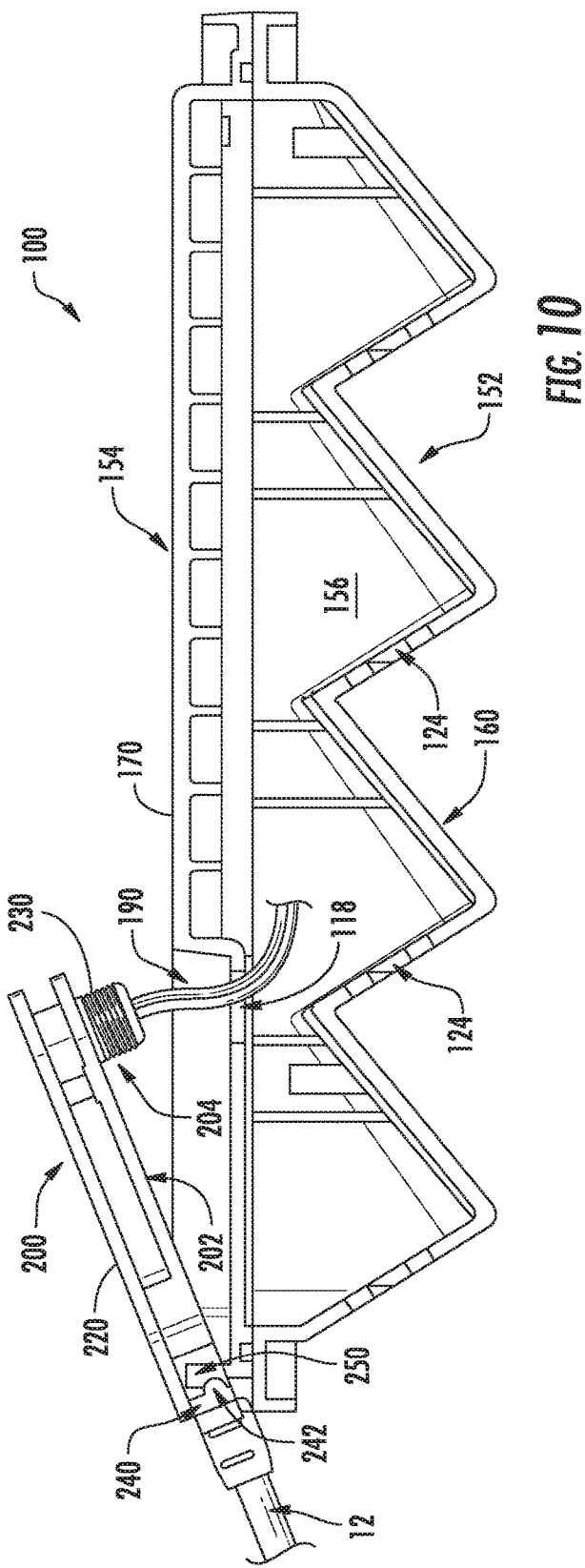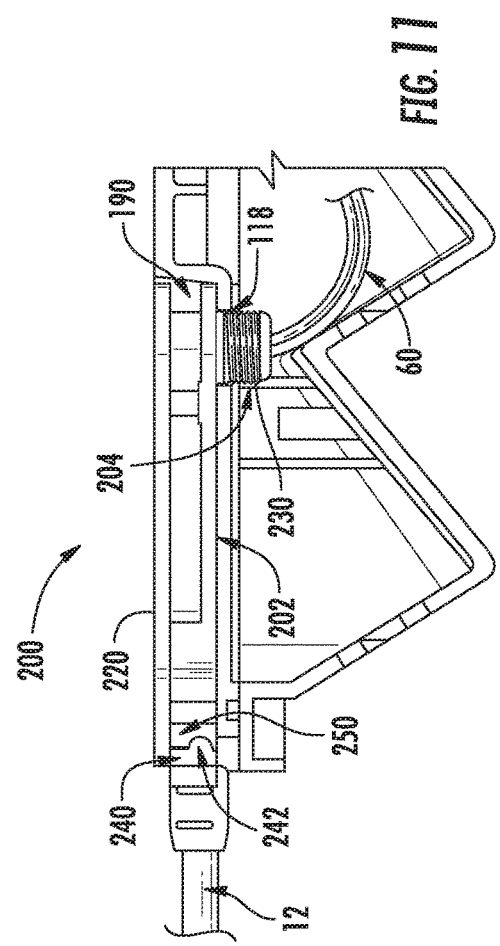

OPTICAL CONNECTION TERMINALS FOR FIBER OPTIC COMMUNICATIONS NETWORKS

This application is a continuation of U.S. patent application Ser. No. 15/493,861, filed on Apr. 21, 2017, the disclosure of which is incorporated by reference herein in its entirety

FIELD

The present disclosure relates generally to optical connection terminals for fiber optic communications networks, and more particularly to multi-port optical connection terminals for use as branch points from all-dielectric self-supporting cables in fiber optic communication networks.

BACKGROUND

Optical fiber is increasingly being used for a variety of applications, including broadband applications such as voice, video and data transmissions. More particularly, fiber optic networks which provide access to a home or premises are growing in popularity. Fiber optic networks which provide such access are commonly referred to as FTTX ("fiber to the X") networks, with X indicating a delivery point such as a premises (i.e. FTTP) or a home (i.e. FTTH).

Recently, multi-port optical connection terminals have been developed for interconnecting drop cables with a fiber optic distribution cable at a predetermined branch point in a fiber optic network between a mid-span access location on the distribution cable and a delivery point such as a subscriber premises. However, as FTTX networks evolve, the requirements for simple and efficient field connections at a variety of locations and from a variety of different cable types is becoming more necessary. Current multi-port optical connection terminals are limited in use to drop cable connection with fiber optic distribution cables. This only allows customer access in limited portions of the FTTX networks.

Accordingly, multi-port optical connection terminals and components thereof which facilitate customer access in different locations along the FTTX network would be advantageous.

BRIEF DESCRIPTION

Aspects and advantages of the invention will be set forth in part in the following description, or may be obvious from the description, or may be learned through practice of the invention.

In accordance with one embodiment, an optical connection terminal assembly for a fiber optic communications network is provided. The terminal assembly includes an optical connection terminal. The optical connection terminal includes a base, the base including an exterior wall, and a cover connected to the base wherein an interior cavity is defined between the base and the cover. The optical connection terminal further includes an all-dielectric self-supporting ("ADSS") cable port defined in the cover, and a plurality of connector ports defined in the exterior wall of the base. The terminal assembly further includes an ADSS cable connector, the ADSS cable connector including a main body and a connector body, the ADSS cable connector positionable such that the connector body extends through the ADSS cable port into the interior cavity. The terminal assembly further includes an ADSS cable connected to the cable connector, wherein optical fibers of the ADSS cable extend through the ADSS cable connector and through the ADSS cable port into the interior cavity.

In accordance with another embodiment, an optical connector assembly for an optical connection terminal is provided. The optical connector assembly includes an all-dielectric self-supporting ("ADSS") cable connector, the ADSS cable connector including a main body and a connector body. A longitudinal axis of the connector body is perpendicular to a longitudinal axis of the main body. The ADSS cable connector further includes a cover panel connected to the main body, the main body defining an interior channel. The optical connector assembly further includes an ADSS cable connected to the cable connector, wherein optical fibers of the ADSS cable extend through the main body and the connector body and exit the ADSS cable connector through the connector body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 is a cross-sectional view of an optical connector assembly being connected to an optical connection terminal in accordance with embodiments of the present disclosure;

FIG. 11 is a cross-sectional view of an optical connector assembly after connection to an optical connection terminal in accordance with embodiments of the present disclosure;

DETAILED DESCRIPTION

Figure 1:
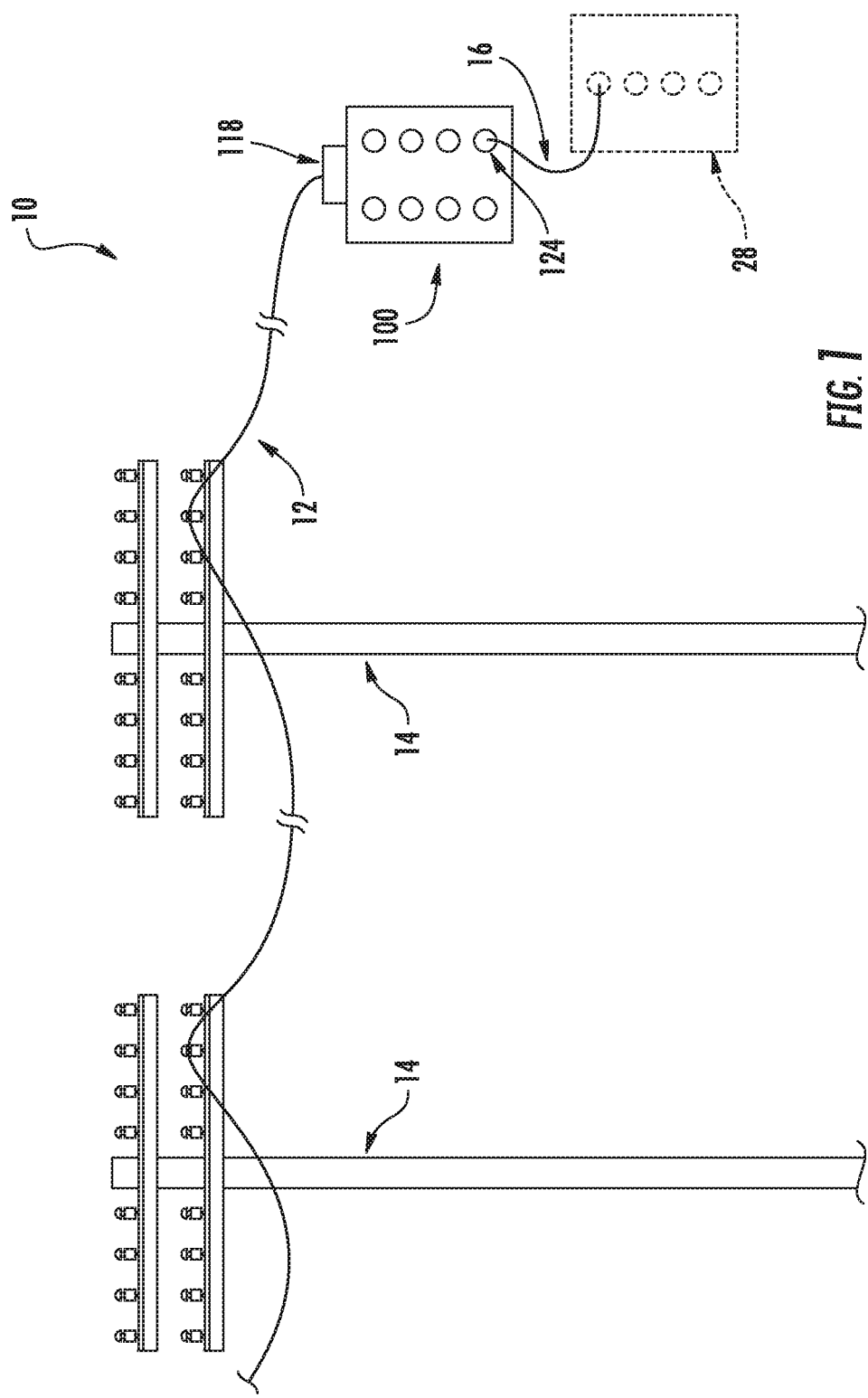
FIG. 1 is a schematic illustration of a fiber optic communications network.
Figure 2:
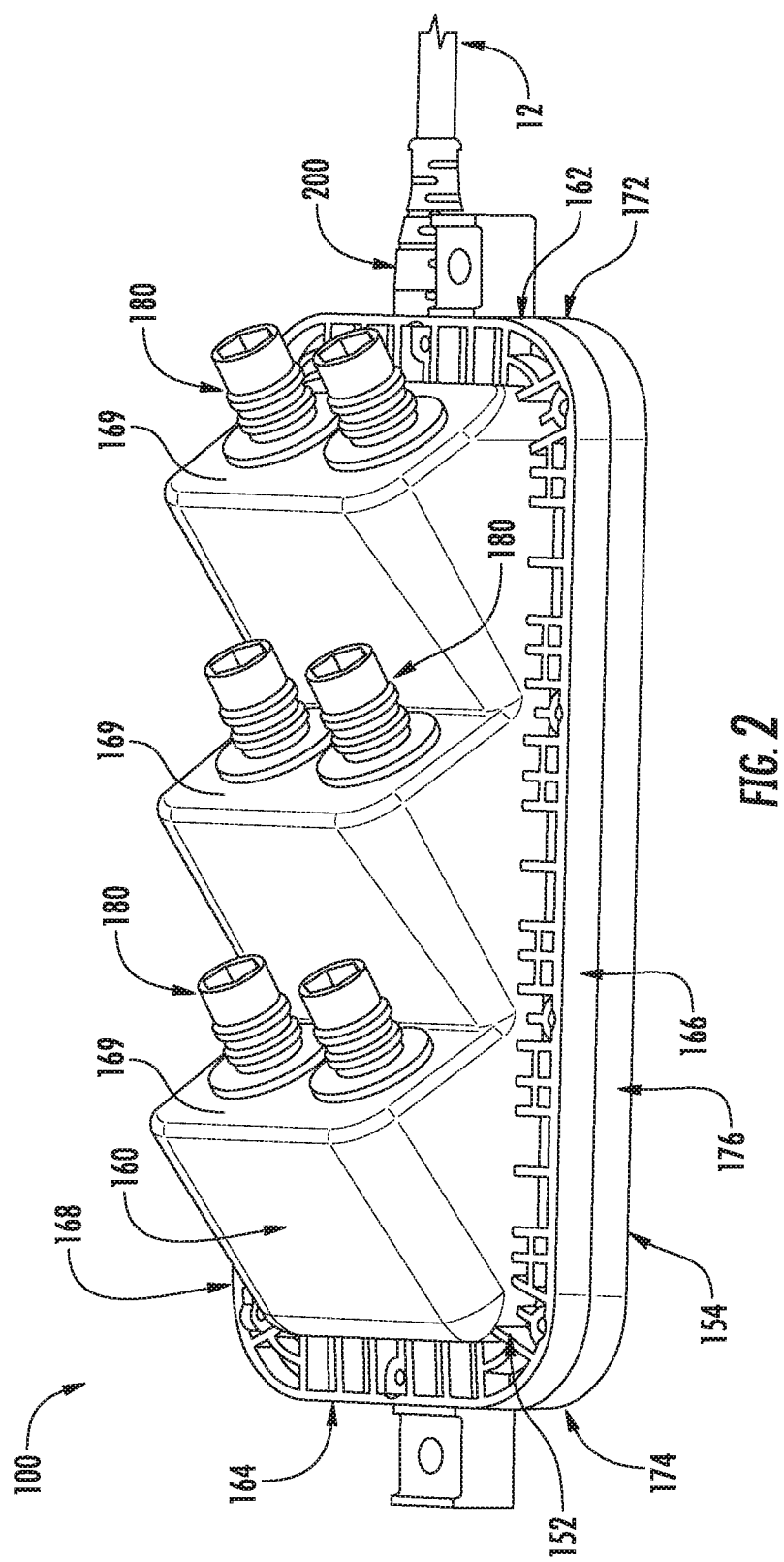
FIG. 2 is a side perspective view of an optical connection terminal assembly in accordance with embodiments of the present disclosure.
Figure 3:
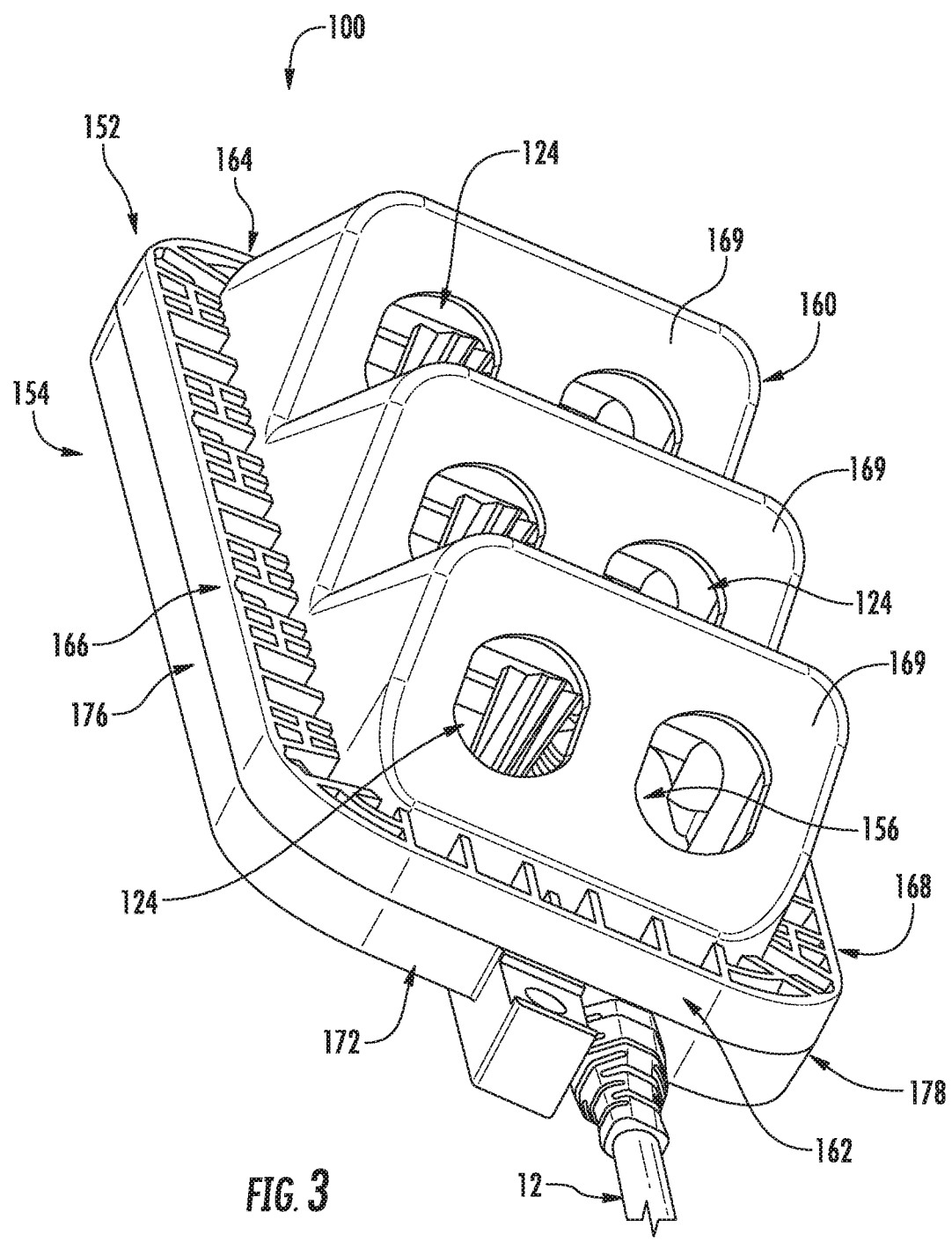
FIG. 3 is an end perspective view of an optical connection terminal assembly in accordance with embodiments of the present disclosure.
Figure 4:
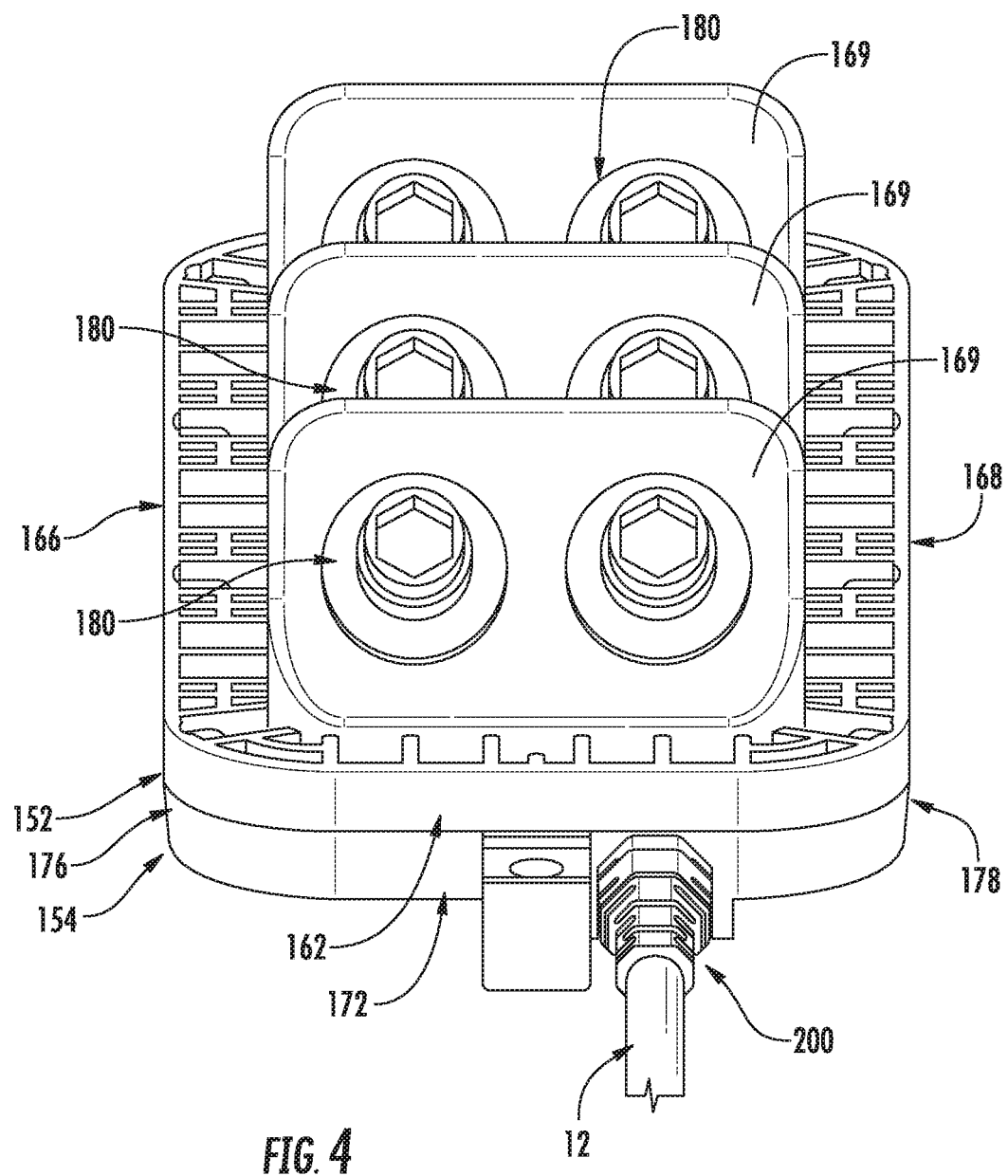
FIG. 4 is another end perspective view of an optical connection terminal assembly in accordance with embodiments of the present disclosure.
Figure 5:
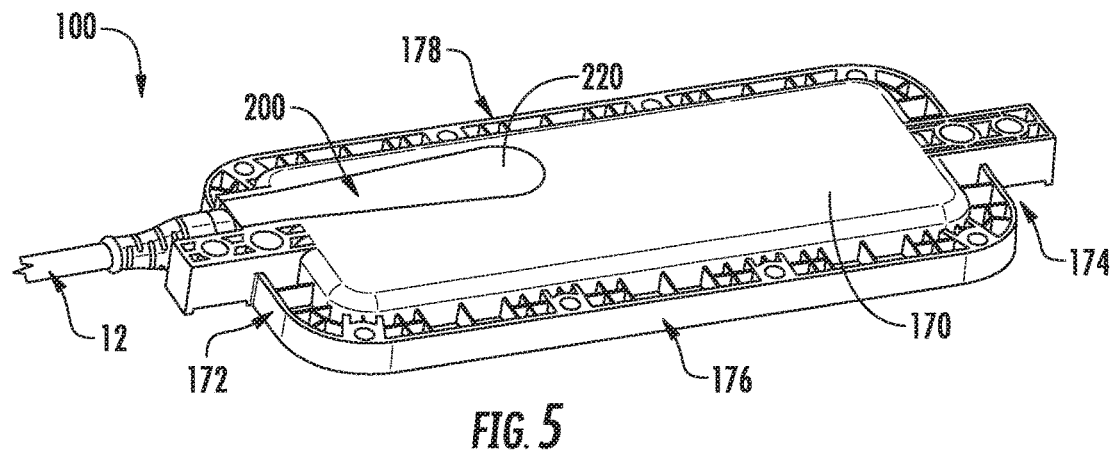
FIG. 5 is a perspective bottom view of a cover, connector, and ADSS cable for an optical connection terminal assembly in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to optical connection terminals for fiber optic communications networks which advantageous provide optical connections between all-dielectric self-supporting ("ADSS") cables and drop cables. For example, the present disclosure provides embodiments of a multi-port optical connection terminal which includes a plurality of connector ports that receive optical connectors for interconnecting one or more pre-connectorized fiber optic drop cables to an ADSS cable in a fiber optic communications network. The various embodiments of the present disclosure may be applied in an optical "fiber-to-the-X" (FTTX) network. As used herein, the term "drop cable" includes a fiber optic cable comprising a cable sheath or jacket surrounding at least one flexible transport tube containing one or more optical fibers. As used herein, the term "optical fiber" includes all types of single mode and multi-mode light waveguides, including one or more bare optical fibers, loose-tube optical fibers, tight-buffered optical fibers, ribbonized optical fibers and/or any other embodiments of a medium for transmitting light signals. Pre-connectorized drop cables may be readily connected to and disconnected from the multi-port optical connection terminal, such as to adaptors disposed within the connector ports thereof, thus eliminating the need for entering the multi-port terminal and splicing the optical fibers of the drop cables to optical fibers of an ADSS cable, as described herein.

The fiber optic drop cables may be optically connected, i.e. via the terminal, to optical fibers of a communications network, such as within a conventional outside plant closure, such as a local convergence cabinet (LCC), a pedestal, a network access point (NAP) closure, or a network interface device (NID). In some embodiments, the fiber optic drop cables extend from a NID located at a subscriber premises and are optically connected through the multi-port optical connection terminal to optical fibers of an ADSS cable in the network. Optical connection terminals in accordance with the present disclosure may thus facilitate the deployment of a FTTX communications network.

The multi-port optical connection terminal provides an accessible interconnection terminal for readily connecting, disconnecting or reconfiguring drop cables in the optical network, and in particular, for interconnecting drop cables with an ADSS cable. As used herein, the term "interconnecting" describes the connection of a drop cable to an ADSS cable through an optical connection terminal in accordance with the present disclosure. In other words, such terminals are quick-connect terminals for connecting drop cables to an ADSS cable of an optical communications network.

In accordance with the present disclosure, the ADSS cable may be securely connected to the optical connection terminal. In particular, an ADSS cable connector of the terminal may be utilized to connect an ADSS cable to the terminal. The connector and terminal may include various advantageous features for securely connecting the ADSS cable to the connector and the connector to the housing of the terminal.

Referring now to FIG. 1, a portion of a known fiber optic communications network 10 which includes an ADSS cable 12 and at least one multi-port optical connection terminal 100 constructed in accordance with the present disclosure is shown. The ADSS cable 12, as is generally understood, is an optical fiber cable that does not include conductive elements. ADSS cable 12 spans between and is installed on utility poles 14 (i.e. electrical or telephone poles), and is typically utilized by electrical utility companies as a communications medium. As shown, an end of the ADSS cable 12 may extend into the multi-port optical connection terminal 100 through an ADSS cable port 118 provided through an exterior wall of the multi-port terminal. The optical fibers of the ADSS cable 12 within the multi-port optical connection terminal 100 may be pre-connectorized, and the optical connectors are each inserted into a connector adapter seated in one of the connector ports 124 provided through an exterior wall of the terminal. One or more pre-connectorized drop cables 16 are then interconnected with the connectorized optical fibers of the ADSS cable 12 by inserting the pre-connectorized ends of the drop cables 16 into the adapters seated in the connector ports 124 from the exterior of the multi-port optical connection terminal 100. An ADSS cable port 118 of the multi-port optical connection terminal 100 receives the ADSS cable 12 therethrough via an ADSS cable connector as discussed herein, and the connector adapters disposed in the connector ports 124 receive the pre-connectorized optical fibers of the ADSS cable 12 and the connectorized ends of the drop cables 16. The drop cables 16 include at least one single mode or multimode optical fiber of any type optically connected to a single fiber or multi-fiber optical connector in a conventional manner. The other ends of the drop cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, an ADSS cable 12 extends, such as from a utility pole 14, to a multi-port optical connection terminal 100 positioned at a distance from the utility pole 14, such as another utility pole, a hand-hole, a vault, or a pedestal (not shown) in the fiber optic network 10. Each drop cable 16 extends from a multi-port optical connection terminal 100 to an outside plant connection terminal 28 located at a delivery point such as a subscriber premises.

Figure 20:
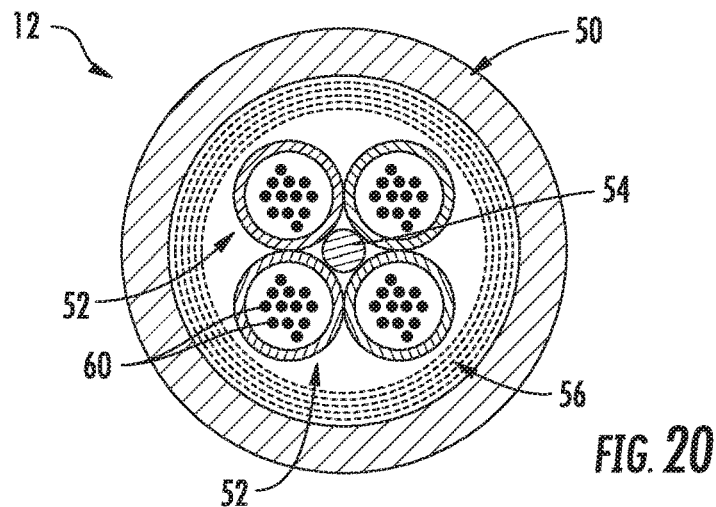
FIG. 20 is a cross-sectional view of an ADSS cable in accordance with embodiments of the present disclosure.
Figure 21:
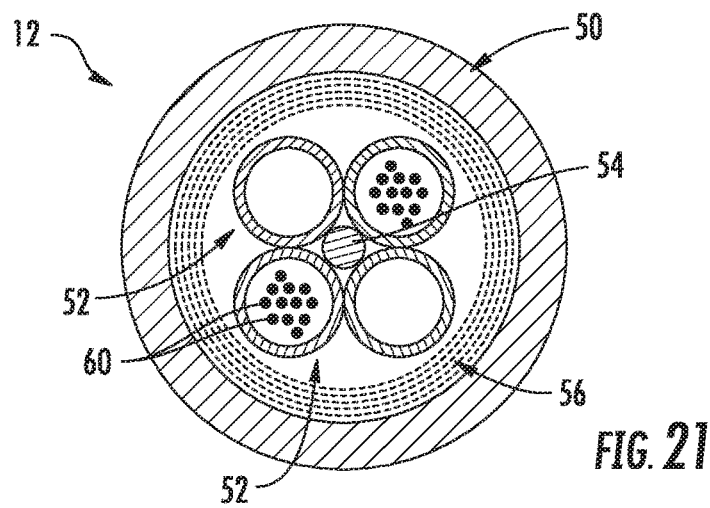
FIG. 21 is a cross-sectional view of an ADSS cable in accordance with embodiments of the present disclosure.

Referring now to FIGS. 20 and 21, cross-sectional views of ADSS cables 12 in accordance with embodiments of the present disclosure are utilized. It should be understood that the present disclosure is not limited to the illustrated ADSS cable 12 embodiments, and rather than any suitable ADSS cable may be utilized. An ADSS cable 12 may include an outer jacket 50 which defines an outermost exterior surface of the ADSS cable 12. Outer jacket 50 may be formed from a suitable polymer such as polyethylene. Within and surrounded by the outer jacket 50 may be one or more buffer tubes 52 and a central strength member 54. Strength fibers 56, which may be formed from an aramid or other suitable material, may also be provided within the outer jacket 50 and surrounding the buffer tubes 52 and central strength member 54. Central strength member 54 may be formed from a suitable plastic, and in particular may be formed from a fiber reinforced polymer material. Buffer tubes 52 may be formed from suitable polymers. The buffer tubes 52 may generally surround the central strength member 54 within the outer jacket 50.

A plurality of optical fibers 60 of the ADSS cable 12 may be provided in one or more of the buffer tubes 52. In some embodiments, as illustrated in FIG. 20, each of the buffer tubes 52 may contain optical fibers 60 therein. In other embodiments, as illustrated in FIG. 21, only select buffer tubes 52 may contain optical fibers 60 therein, while the remaining buffer tubes 52 are free from and thus do not include optical fibers therein and are thus considered filler tubes.

Referring now to FIGS. 2-19, exemplary embodiments of optical connection terminals 100, optical connection terminal assemblies, and various components thereof in accordance with the present disclosure are provided. An optical connection terminal assembly may generally include an optical connection terminal 100, including a connector 200 as discussed herein, along with a connected cable 12 and/or cables 16 as discussed herein. As discussed, multi-port optical connection terminals 100 in accordance with the present disclosure permit one or more pre-connectorized fiber optic drop cables 16 to be readily interconnected with optical fibers of ADSS cable 12. Further, such multi-port optical connection terminals 100 provide a convenient connection point for a field technician to initially install and subsequently reconfigure the optical connections between the various drop cables 16 and the connector ports 124 provided on the multi-port terminal 100. Further, multi-port optical connection terminals 100 in accordance with the present disclosure advantageously include improved apparatus for securely connecting the ADSS cable 12 to the terminal. Such features as discussed herein advantageously enhance the terminal performance and limit mechanical stress during field installation.

As shown, a terminal 100 in accordance with the present disclosure may include a housing which may, for example, be formed from a base 152 and a cover 154. The base 152 and cover 154 may be formed from suitable materials, which may for example be lightweight and rigid. For example, suitable polymers or metals may be utilized.

Base 152 may include an exterior wall 160 which may define an interior cavity of the base 152. Further, a plurality of connector ports 124 may extend through the exterior wall 160 and provide access to the interior cavity. For example, the exterior wall 160 may include a first end wall 162, a second opposing end wall 164 which is opposite the first end wall 162 along a longitudinal axis of the terminal 100, a first sidewall 166, and a second opposing sidewall 168 which is opposite the first sidewall 166 along a lateral axis of the terminal 100. The sidewalls and end walls may, for example, generally form an outer perimeter of the base 152.

The exterior wall 160 may further include one or more angled surfaces 169, which may for example, each extend at an angle to a plane defined by the lateral and longitudinal axes of the terminal 100. In these embodiments, the connector ports 124 may be defined in the angled surfaces 169. For example, one or more connector ports 124 may be defined in each angled surface 169 as shown. Alternatively, other suitable surfaces may be provided between the sidewalls and end walls of the exterior wall 160, and the connector ports 124 may extend through one or more of these surfaces.

As illustrated, in exemplary embodiments the terminal 100 may include a plurality of connector adaptors 180. Each adaptor 180 may extend through one of the plurality of connector ports 124. The connector adaptors 180 may facilitate the connection of optical fibers from ADSS cable 12 to optical fibers of the drop cables 16. For example, as discussed, ends of the ADSS cable 12 optical fibers 60 may be connectorized. Each such connector may be coupled to an adaptor 180 on the interior cavity side of the adaptor 180, i.e. the side of the adaptor 180 that is disposed within the interior cavity 156. Further, ends of the drop cable 16 optical fibers may be connectorized. Each such connector may be coupled to an adaptor 180 on the exterior cavity side of the adaptor 180. The adaptor 180 may thus connect the connectors and optical fibers to provide optical communication between the ADSS cable 12 and each drop cable 16.

The optical fiber connectors as discussed herein may be any suitable commercially available connectors such as, for example, SC, LC, FC, ST, SC/DC, MT-RJ, MTP and/or MPO connectors.

The cover 154 may be connected to the base 152. Cover 154 may include an exterior wall which may define an interior cavity of the cover 154. An interior cavity 156 may thus collectively be defined between the base 152 and the cover 154 by the interior cavit(ies) of the base 152 and/or cover 154. The interior cavity 156 may, in some embodiments, generally be utilized for housing fiber optic hardware, such as adapters, optical fiber routing guides, fiber hubs, splitters, etc.

The exterior wall of the cover 154 may include a first end wall 172, a second opposing end wall 174 which is opposite the first end wall 172 along a longitudinal axis of the terminal 100, a first sidewall 176, and a second opposing sidewall 178 which is opposite the first sidewall 176 along a lateral axis of the terminal 100. The sidewalls and end walls may, for example, generally form an outer perimeter of the cover 154. Cover 154, such as the exterior wall thereof, may further include a bottom panel 170. The bottom panel 170 may extend between the first and second sidewalls 176, 178 along the lateral axis and between the first and second end walls 172, 170 along the longitudinal axis.

Referring now in particular to FIGS. 5-11, an exterior channel 190 may be defined in the bottom panel 170. The exterior channel 190 may thus be a recessed or depressed portion of the bottom panel 170 as shown. As discussed herein, an ADSS cable connector 200 may be positionable such that at least a portion of the connector 200 is disposed within the exterior channel 190. Further, an outer surface of the connector 200 (i.e. a cover panel thereof as discussed herein) may, when the connector 200 is seated in the exterior channel 190, be flush with the bottom panel 170 (i.e. the outermost portion of the surface of the bottom panel 170 not forming the exterior channel 190).

In exemplary embodiments as shown, the exterior channel 190 may extend longitudinally. For example, an entrance 192 to the exterior channel 190 may be defined underneath the end wall 172 as shown or end wall 174. Alternatively, however, the exterior channel 190 may extend laterally or in another suitable direction. For example, entrance 192 may be defined underneath the sidewall 176 or sidewall 178.

Further, an ADSS cable port 118 may be defined in the bottom panel 170, such as within the exterior channel 190, and may provide access to the interior cavity 156. When the ADSS cable connector 200 is positioned in the exterior channel 190, a portion of the ADSS cable connector 200 may extend through the ADSS cable port 118 and into the interior cavity 156.

Referring now in particular to FIGS. 5-19, embodiments of an ADSS cable connector 200 and optical connector assembly in accordance with the present disclosure are provided. An optical connector assembly in accordance with the present disclosure includes an ADSS cable connector 200 and an ADSS cable 12, as discussed herein. ADSS cable connector 200 may include a main body 202 and a connector body 204, and as discussed may be positionable at least partially within the exterior channel 190. In particular, the connector 200 may be positionable such that the main body 202 (such as a portion thereof) is within the exterior channel 190 and the connector body 204 extends through the ADSS cable port 118 and into the interior cavity 156.

Main body 202 and connector body 204 may each extend along a longitudinal axis 203, 205, respectively. The longitudinal axis 205 of the connector body 204 may be at an angle to the longitudinal axis 203 of the main body 202. For example, in exemplary embodiments, longitudinal axis 205 may be perpendicular to the longitudinal axis 203. Accordingly, in exemplary embodiments when positioned at least partially within the exterior channel 190, the main body 202 and longitudinal axis 203 thereof may extend along the longitudinal axis of the terminal 100 and the connector body 204 may extend perpendicular to the longitudinal axis and lateral axis of the terminal 100.

The main body 202 may define an interior channel 206 that extends therethrough. When an ADSS cable 12 is connected to the ADSS cable connector 200, a portion of the ADSS cable 12 may thus be disposed within the interior channel 210. The connector body 204 may define an interior passage 208 that extends therethrough and is in communication with the interior channel 206. Optical fibers 60 of the ADSS cable 12 may extend from the interior channel 206 through the interior passage 208. Further, when the connector 200 is positioned at least partially within the exterior channel 190 and the connector body 204 thus extends through the ADSS cable port 118, the optical fibers 60 may exit the connector body 204 in the interior cavity 156. Within the interior cavity 156, connectorized ends of the optical fibers 60, such as connectors thereof, may be connected to the adaptors 180 (i.e. the portions of the adaptors 180 within the interior cavity 156) to provide optical communication between the ADSS cable 12 and each drop cable 16 (i.e. the connectorized optical fibers thereof).

To securely connect the ADSS cable connector 200 to the ADSS cable 12 and form an optical connector assembly, retainers 210 may be provided in the main body 202. For example, one or more retainers 210 may extend into the interior channel 206 to securely hold the ADSS cable 12. In exemplary embodiments as shown, the retainers 210 are sawteeth sidewalls, i.e. sawteeth shaped portions of the interior sidewalls defining the interior channel 206. The sawteeth sidewalls may contact and in some embodiments protrude into the outer jacket 50 of the ADSS cable 12, thus securely grasping and holding the ADSS cable 12 within the interior channel 206.

Additionally or alternatively, an adhesive 211 may be disposed in the interior channel 206. Adhesive 211 may further be disposed in the interior passage 208. Such adhesive may be provided between the ADSS cable 12 and the interior sidewall(s) defining the interior channel 206, and may adhere the ADSS cable 12 to the sidewall(s), thus securing the connector 200 to the ADSS cable 12. The adhesive may further be provided between the exposed optical fibers 60 and the interior sidewall(s) defining the interior channel 206 and/or interior passage 208, thus surrounding, securing, and protecting the exposed optical fibers 60 within the interior passage 208. Notably, the adhesive 211 in addition to securing the connector 200 to the ADSS cable 12 may also advantageously prevent moisture ingress into the connector 200 and contact with the optical fibers 60.

In some exemplary embodiments, the adhesive 211 may be a suitable epoxy or suitable urethane material. In some embodiments, a material with a relatively higher viscosity may be utilized. For example, a material having a viscosity of between 50,000 and 60,000 cP at 25° C., which may in some embodiments be an epoxy, may be utilized. In other embodiments, a material with a relatively lower viscosity may be utilized. Lower viscosity materials may be particularly advantageous, as they provide better flow within the connector 200 and seal with the cable 12, thus resulting in improved secure connector-cable connections and further resulting in improved moisture ingress prevention. For example, a material having a viscosity of between 400 and 900 cP at 25° C., such as between 500 and 800 cP at 25° C., such as between 600 and 700 cP at 25° C., such as 650 cP at 25° C., may be utilized. In exemplary embodiments, the material may be a urethane.

Figure 15:
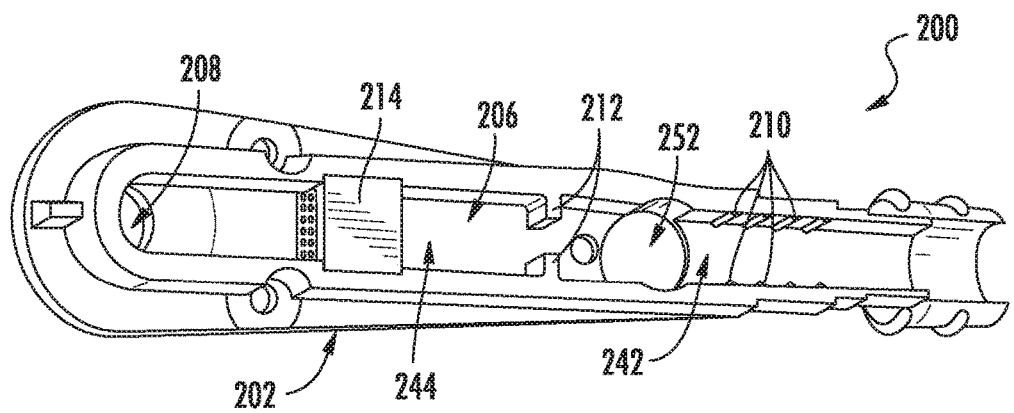
FIG. 15 is a bottom perspective view of components of an ADSS cable connector in accordance with embodiments of the present disclosure.
Figure 17:
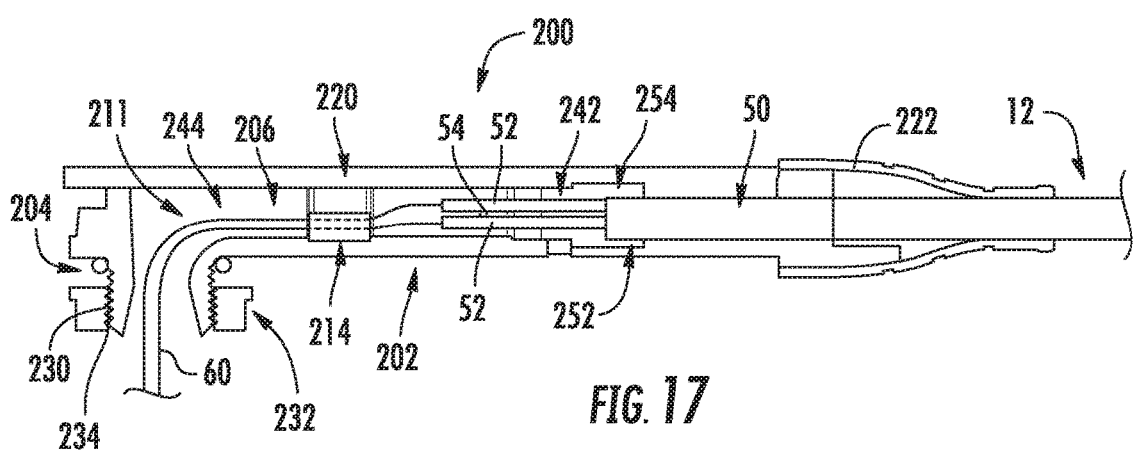
FIG. 17 is a side sectional view of an optical connector assembly in accordance with embodiments of the present disclosure.
Figure 18:
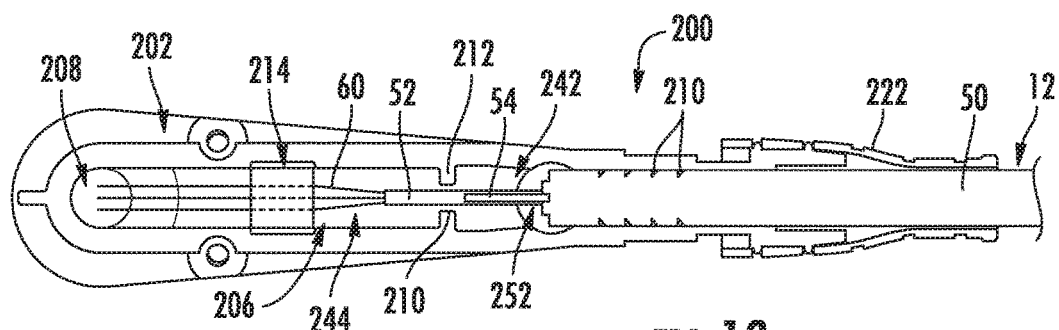
FIG. 18 is a bottom view of an optical connector assembly, with a cover panel removed, in accordance with embodiments of the present disclosure.

In some embodiments, as illustrated in FIGS. 15, 17, and 18, a pocket 252 may be defined in the main body 202 (such as in a first portion 242 of the interior channel 206 as discussed herein). Pocket 252 may be a depression defined in a sidewall(s) defining the interior channel 206, and may provide a gap between such sidewall(s) and the cable 12. Adhesive 211 may thus flow into the gap to better surround and secure the cable 12 within the connector 200.

ADSS cable connector 200 may further include opposing protrusions 212 which extend into the interior channel 206 and divide the interior channel 206 into sub-compartments, such as a first portion 242 and a second portion 244 as shown. The first portion 242 may be the portion into which the cable 12 enters the connector 200, while the second portion 242 leads to and is in communication with the connector body 204. The protrusions 212 may act as restrictions on the cross-sectional size of the interior channel 206 in order to prevent portions of the ADSS cable 12 from extending therethrough. For example, when properly positioned in the interior channel 206, strength fibers 56 and strength member 54, as well as outer jacket 50, may terminate in the first portion 242. Accordingly, these components of the cable 12 may not extend between the protrusions 212 and into the second portion 244. One or more of the buffer tubes 52, however, and in particular the buffer tubes 52 that include optical fibers 60 therein, may extend from the first portion 242 between the protrusions 212 and into the second portion 244. Notably, in some embodiments, buffer tubes 52 that do not include optical fibers 60 therein may terminate in the first portion 242. Within the second portion 244, buffer tubes 52 that extend past the protrusions 212 may terminate. The optical fibers 60 may extend therefrom and continue into the interior passage 208 as discussed herein.

Figure 22:
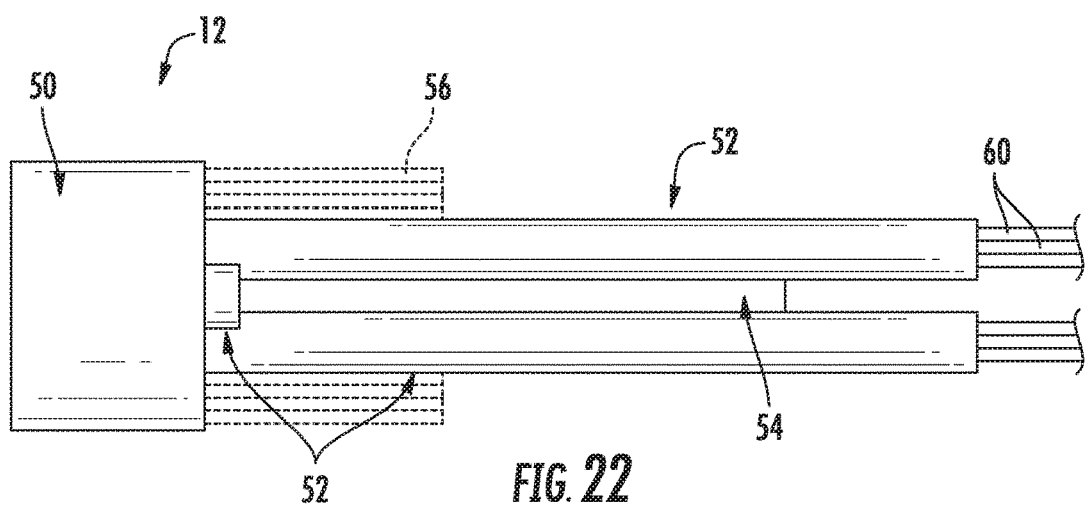
FIG. 22 is top view of an ADSS cable prepared for insertion into an ADSS cable connector in accordance with embodiments of the present disclosure.

Referring briefly to FIG. 22, a cable 12 is illustrated that is prepared for insertion into a connector 200. As shown, outer jacket 50 is trimmed back to expose buffer tubes 52, strength member 54, and strength fibers 56. The buffer tubes 52 that include optical fibers 60 are trimmed to an exposed length (extending from the outer jacket 50) that allows them to extend into the second portion 244. The strength member 54, strength fibers 56, and buffer tubes 52 that do not include optical fibers 60 are trimmed to exposed lengths that are shorter than that of the buffer tubes 52 that include optical fibers 60, such that these components terminate in the first portion 242 when the cable 12 is inserted into the connector 200.

Figure 19:
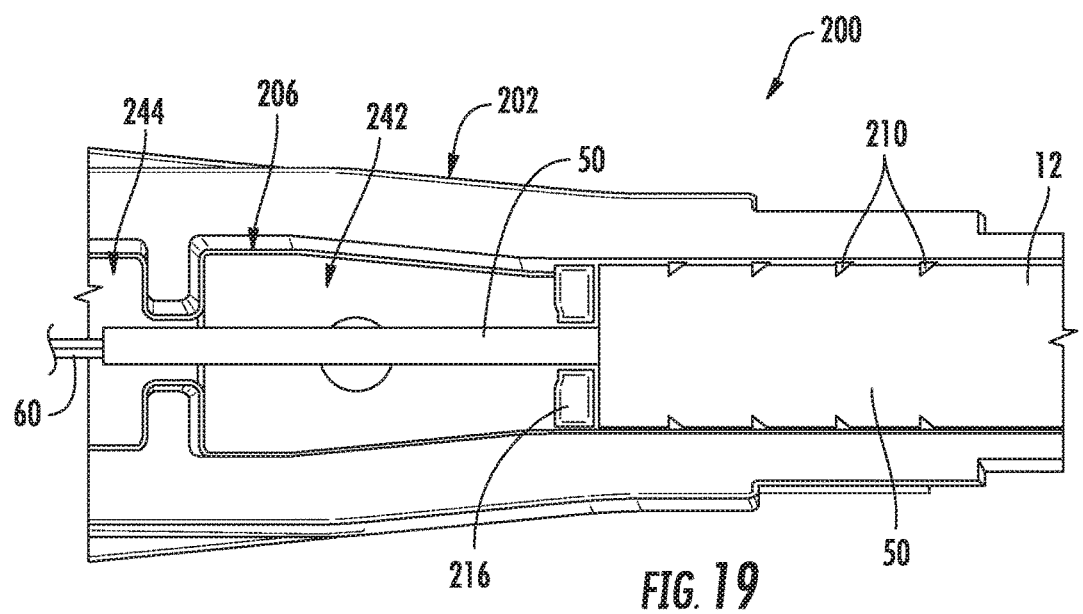
FIG. 19 is a bottom view of a portion of an optical connector assembly, with a cover panel removed, in accordance with embodiments of the present disclosure.

ADSS cable connector 200 may further, in some embodiments as shown in FIG. 19, include one or more stops 216 which extend into the interior channel 206. Stops 216 may, as shown, be disposed in the first portion 242. Stops 216 may assist with positioning of the cable 12 within the connector 200 by providing a contact point for an end of the outer jacket 50. As shown, the outer jacket 50 may contact and terminate at the stops 216. Other components of the cable 12, such as the strength member 54, strength fibers 56, and buffer tubes 52, may extend past the stops 216.

ADSS cable connector 200 may further include a furcation block 214 through which the optical fibers 60 may pass. The furcation block 214 may be disposed within the interior channel 206, such as within the second portion 244 thereof, and may assist in separating the optical fibers 60 as the fibers emerge from the buffer tubes 52, as shown. The optical fibers 60 may then extend from the furcation block 214 and interior channel 206 into the interior passage 208, and from the interior passage 208 into the interior cavity 156 as discussed.

ADSS cable connector 200 may further include a cover panel 220. The cover panel 220 may be connected, such as hingedly connected, to the main body 202. Cover panel 220 may provide access to the interior channel 206, as shown, and may protect and secure the ADSS cable 12 and optical fibers 60 thereof when in the closed position. In exemplary embodiments, an outer surface of the cover panel 220 is flush with the bottom panel 180, as discussed above, when the ADSS cable connector 200 when the ADSS cable connector 200 is properly seated in the exterior channel 190. It should be noted that, in alternative embodiments, no cover panel 220 may be necessary and the interior channel 206 may be defined in the main body 202 such that a portion of the main body 202 forms an integral cover.

As discussed, cover panel 220 may be hingedly connected to the main body 202. For example, and referring to FIGS. 9-11, in some exemplary embodiments, one or more, such as in exemplary embodiments a pair, of hinge arms 240 may extend from cover panel 220. Each hinge arm 240 may further include a distal end 242 opposite the connection of the hinge arm 240 to the cover panel 220. A pivot point 244 may be defined by the distal end 242, and the hinge arm 240 and cover panel 220 may be rotatable towards and away from the main body 202 about such pivot point 244 (perpendicularly to axes 203 and 205). Distal end 242 may further protrude inwardly, and may fit within a depression 246 defined in the main body 202, such as the outer surface thereof. Such connection between the distal end 242 and depression 246 positions the cover panel 220 relative to the main body 202 and facilitates rotation of the cover panel 220 relative to the main body 202.

Figure 6:
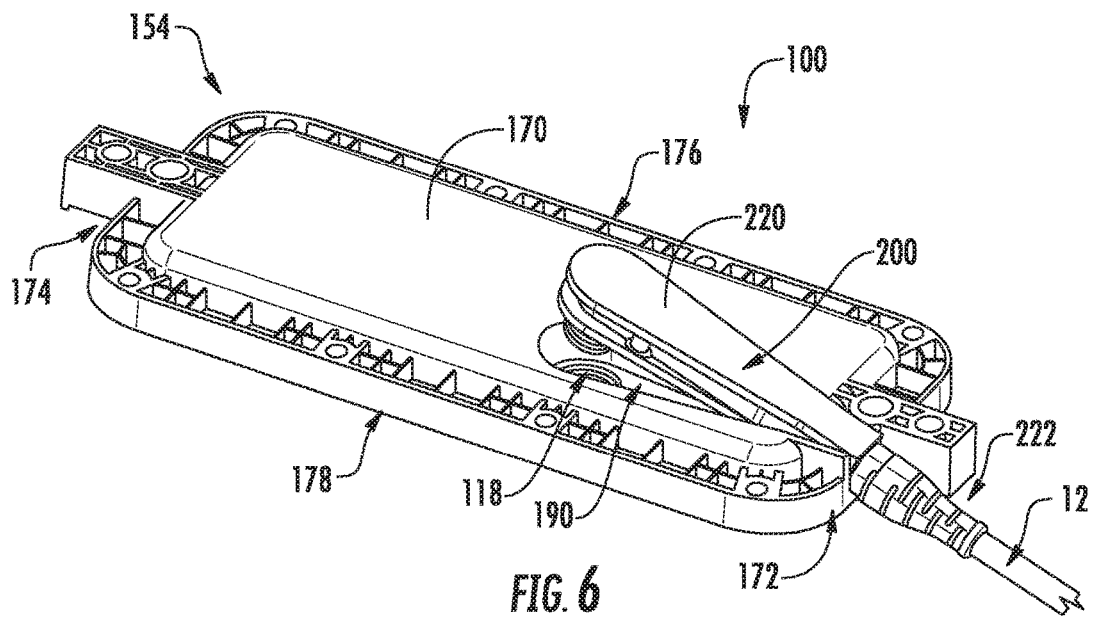
FIG. 6 is a perspective bottom view of a cover for an optical connection terminal assembly, with an ADSS cable connector partially removed, in accordance with embodiments of the present disclosure.
Figure 7:
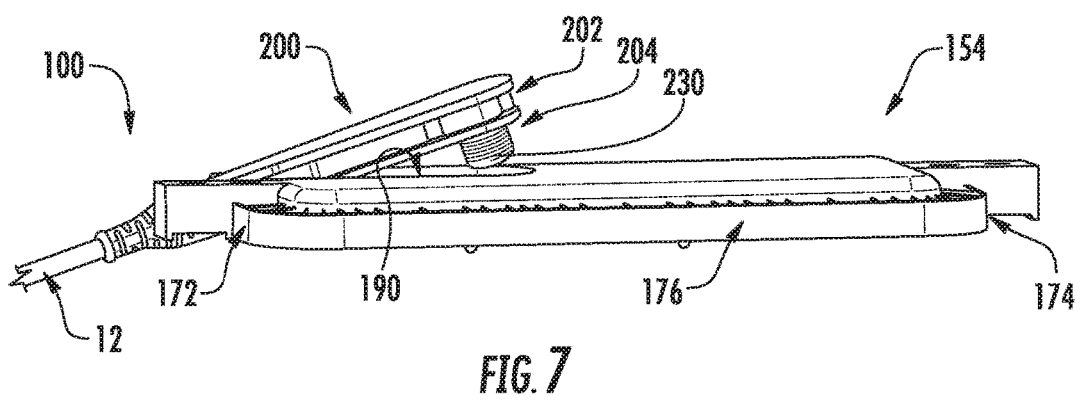
FIG. 7 is a perspective side view of a cover for an optical connection terminal assembly, with an ADSS cable connector partially removed, in accordance with embodiments of the present disclosure.
Figure 8:
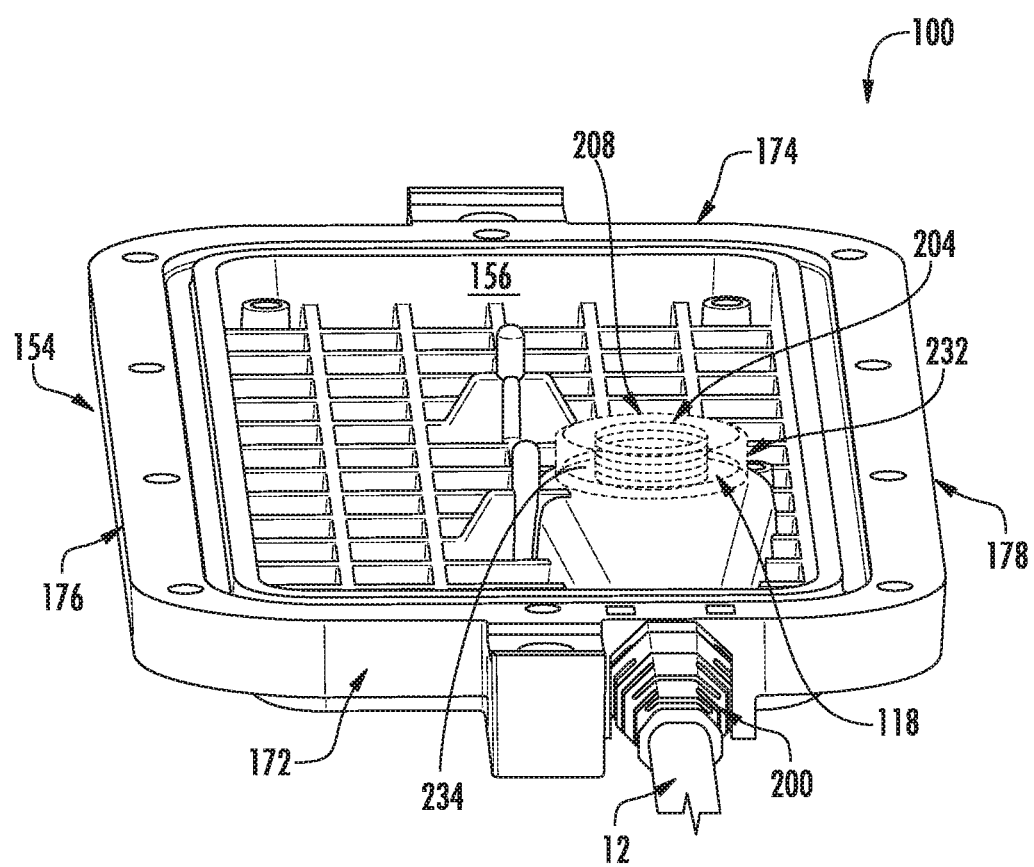
FIG. 8 is a perspective top view of a cover and optical connector assembly for an optical connection terminal assembly in accordance with embodiments of the present disclosure.
Figure 9:
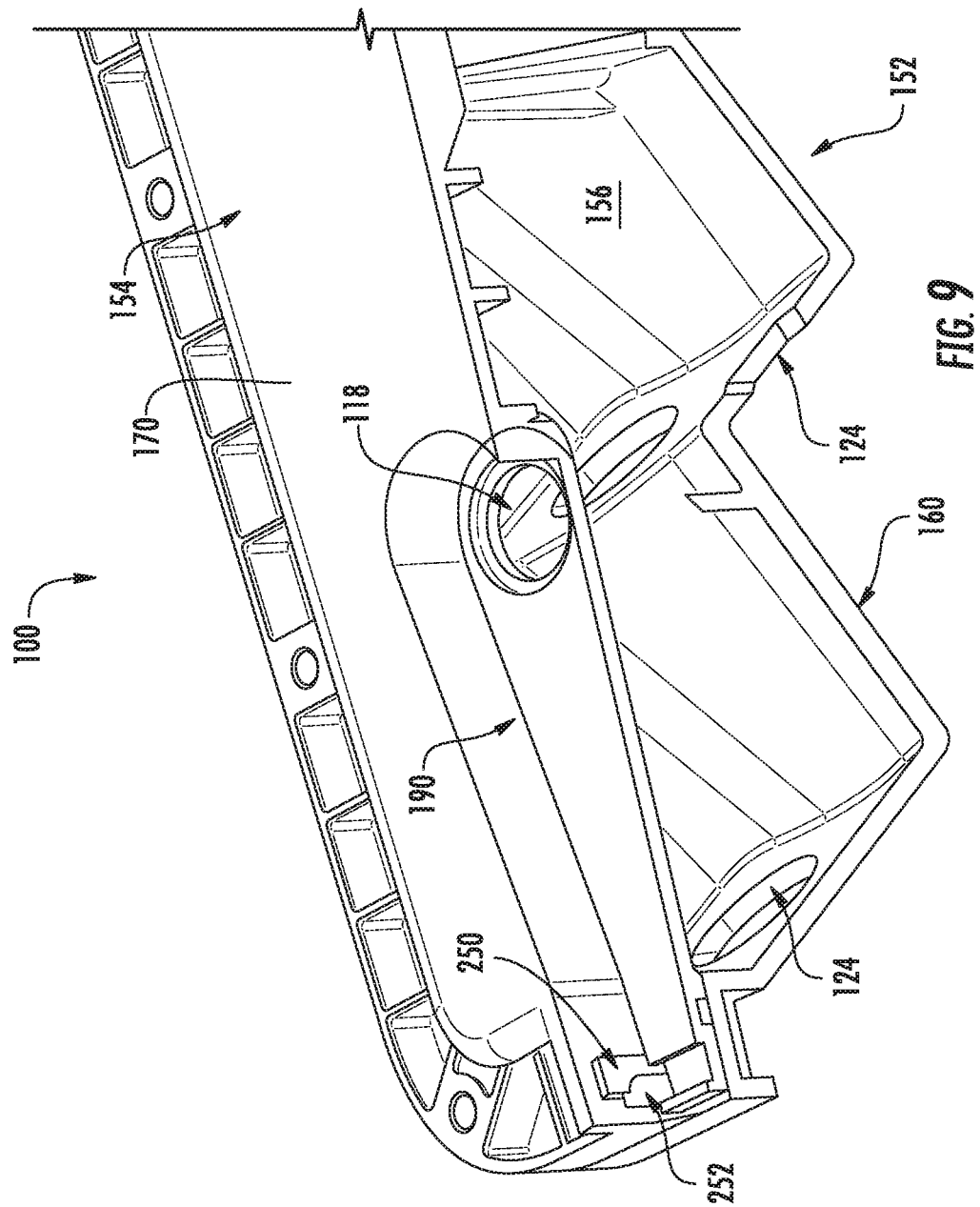
FIG. 9 is a perspective sectional view of a portion of an optical connection terminal in accordance with embodiments of the present disclosure.
Figure 12:
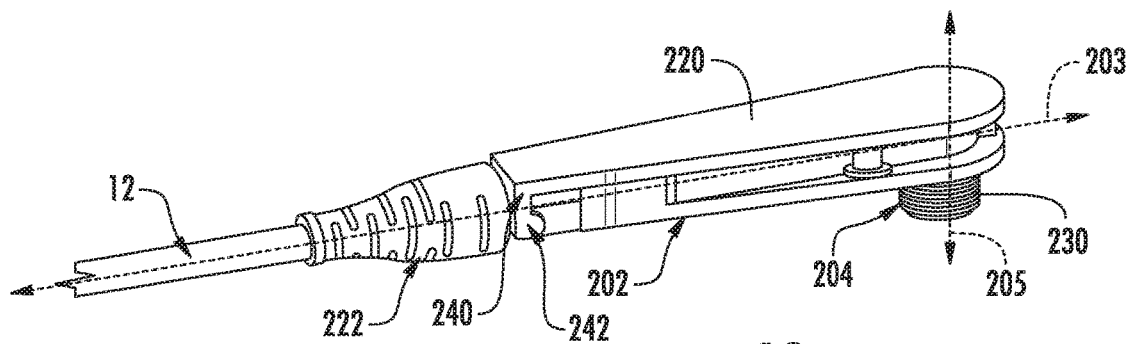
FIG. 12 is a perspective bottom view of an optical connector assembly for an optical connection terminal in accordance with embodiments of the present disclosure.
Figure 13:
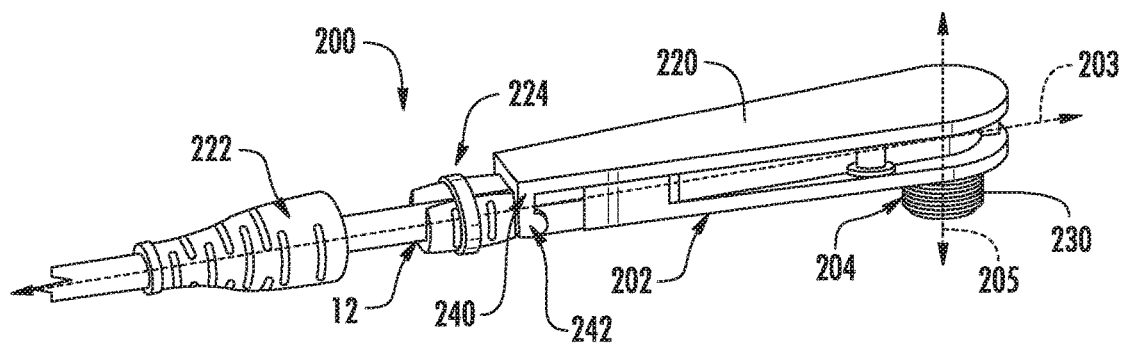
FIG. 13 is a perspective bottom view of an optical connector assembly for an optical connection terminal, with a boot partially removed, in accordance with embodiments of the present disclosure.
Figure 14:
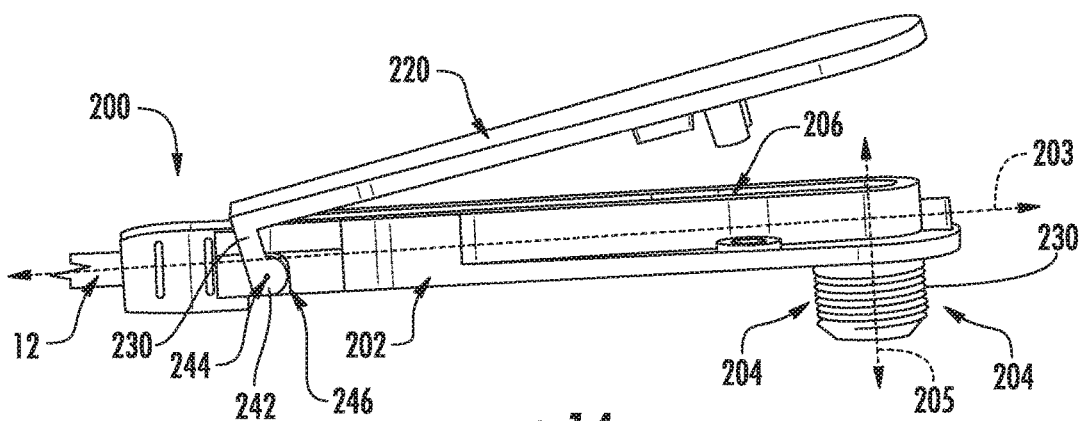
FIG. 14 is a side view of an optical connector assembly for an optical connection terminal, with a cover panel partially removed, in accordance with embodiments of the present disclosure.

The hinge arms 240 and distal ends 242 thereof may further assist with securing the ADSS cable connector 200 in the exterior channel 190. For example, as shown in FIGS. 6, 7 and 14, the ADSS cable connector 200 may be rotatable into and out of a fully seated position in the exterior channel 190. As shown in FIGS. 9-11, protrusions, such as hook-shaped protrusions 250 as shown, may extend into the exterior channel 190 and contact the hinge arms 240 and distal ends 242 to catch the hinge arms 240 and thus the ADSS cable connector 200. The distal ends 242 may further seat within depressions 252 defined in the walls defining the exterior channel 190. This may position the ADSS cable connector 200 partially or fully within the exterior channel 190, thus securing the ADSS cable connector 200 to the cover 154 and facilitating rotation thereof into the fully seated position in the exterior channel 190.

Figure 16:
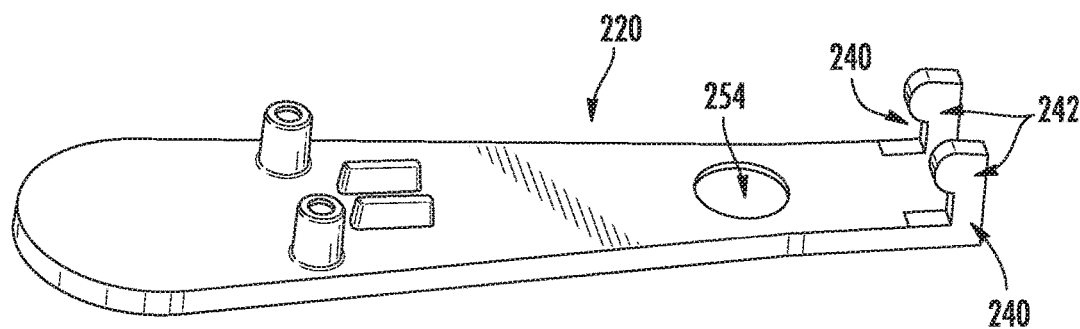
FIG. 16 is a perspective view of a cover panel of an ADSS cable connector in accordance with embodiments of the present disclosure.

In some embodiments, as illustrated in FIGS. 16 and 17, a pocket 254 may be defined in the cover panel 220. Pocket 254 may be a depression defined in an inner surface of the cover panel 220 that further defines the interior channel 206 and, similar to pocket 252, may provide a gap between such surface and the cable 12. Adhesive 211 may thus flow into the gap to better surround and secure the cable 12 within the connector 200.

ADSS cable connector 200 may further include a boot 222 which may be connected to the main body 202, such as opposite the connector body 204. The ADSS cable 12 may extend through the boot 222 prior to entering the main body 202, as shown. Boot 222 may protect the portion of the ADSS cable 12 protruding from the main body 202 at that end of the main body 202 and further secure the ADSS cable 12 to the connector 200.

Further, in some exemplary embodiments, a clamp ring 224 (which may for example be a crimp ring) may be positioned around the cable 12 and between the main body 202 and the boot 222. Clamp ring 224 may further secure the cable 12 to the main body 202.

To secure the connector 200 to the housing of the terminal 100, a connection may be provided which affirmatively couples the connector 200 to the housing. For example, in exemplary embodiments as shown, the connector body 204 may be threaded. External threads 230 may thus be provided on the connector body 204. When the connector 200 is properly seated in the exterior channel 190, the threads 230 may extend through the ADSS cable port 118 such that at least a portion of the threads are disposed in the interior cavity 156. In further exemplary embodiments, a threaded nut 232 (which may include internal threads 234) may be provided. The threaded nut 232 may be positionable within the interior cavity 156, and may threadably engage the connector body 204 in the interior cavity 156. Such threaded engagement connects the connector 200 to the cover 154 and housing generally, thus securing the ADSS cable 12 to the terminal 100.

Accordingly, ADSS cable connectors 200, the positioning of the ADSS cable port 118, and terminals 100 in accordance with the present disclosure provide a variety of advantages, including ensuring that the ADSS cable 12 is securely connected to the terminal 100. For example, such apparatus advantageously allows for the ADSS cable 12 to be quickly and efficiently removed and replaced, i.e. in the field. Optical fibers 60 of the ADSS cable 12 can be easily routed into the terminal housing through the ADSS cable connector 200, enhancing terminal 100 performance and reducing mechanical stress during field installation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical connection terminal assembly for a fiber optic communications network, the terminal assembly comprising:
    an optical connection terminal, the optical connection terminal comprising:
       a base, the base comprising an exterior wall;
       a cover connected to the base wherein an interior cavity is defined between the base and the cover;
       an all-dielectric self-supporting ("ADSS") cable port defined in the cover; and
       a plurality of connector ports defined in the exterior wall of the base; and
    an ADSS cable connector, the ADSS cable connector comprising a main body and a connector body, wherein the main body defines an interior channel and a furcation block is disposed within the interior channel, the ADSS cable connector positionable such that the connector body extends through the ADSS cable port into the interior cavity.

2. The optical connection terminal assembly of claim 1, further comprising an ADSS cable connected to the cable connector, wherein optical fibers of the ADSS cable extend through the ADSS cable connector and through the ADSS cable port into the interior cavity.

3. The optical connection terminal assembly of claim 2, wherein the optical fibers extend through the furcation block.

4. The optical connection terminal assembly of claim 2, wherein the main body comprises opposing protrusions extending into the interior channel, the opposing protrusions dividing the interior channel into a first portion and a second portion, wherein strength fibers and a strength member of the ADSS cable terminate in the first portion and buffer tubes of the ADSS cable terminate in the second portion.

5. The optical connection terminal assembly of claim 2, wherein the main body defines an interior channel and a stop extends into the interior channel, and wherein an outer jacket of the ADSS cable contacts and terminates at the stop.

6. The optical connection terminal assembly of claim 1, wherein the cover comprises a bottom panel, a first end wall, a second opposing end wall, a first sidewall, and a second opposing sidewall, wherein the bottom panel extends between the first end wall and opposing second end wall and between the first side wall and second opposing sidewall, wherein an exterior channel is defined in the bottom panel, and wherein the ADSS cable port is defined in the bottom panel within the exterior channel of the cover.

7. The optical connection terminal assembly of claim 6, wherein the ADSS cable connector is positionable such that the main body is within the exterior channel and the connector body extends through the ADSS cable port into the interior cavity.

8. The optical connection terminal assembly of claim 1, wherein the connector body is threaded.

9. The optical connection terminal assembly of claim 1, wherein the main body comprises a retainer extending into the interior channel.

10. The optical connection terminal assembly of claim 1, wherein the main body defines an interior channel and a pocket.

11. The optical connection terminal assembly of claim 1, wherein an adhesive is disposed within the main body and the connector body, the adhesive contacting the ADSS cable.

12. The optical connection terminal assembly of claim 11, wherein the adhesive has a viscosity of between 400 and 900 cP at 25° C.

13. The optical connection terminal assembly of claim 1, wherein the ADSS cable connector further comprises a cover panel, the cover panel connected to the main body.

14. The optical connection terminal assembly of claim 1, wherein the ADSS cable connector further comprises a boot, the boot connected to the main body.

15. An optical connector assembly for an optical connection terminal, the optical connector assembly comprising:
    an all-dielectric self-supporting ("ADSS") cable connector, the ADSS cable connector comprising a main body and a connector body, wherein the main body defines an interior channel and a furcation block is disposed within the interior channel; and
    an ADSS cable connected to the cable connector, wherein optical fibers of the ADSS cable extend through the main body, the furcation block, and the connector body and exit the ADSS cable connector through the connector body.

16. The optical connector assembly of claim 15, wherein the ADSS cable comprises an outer jacket, a fiber-reinforced polymer strength member and a plurality of buffer tubes disposed within the outer jacket, and a plurality of optical fibers disposed in at least one of the plurality of buffer tubes.

17. The optical connector assembly of claim 15, wherein a retainer extending into the interior channel, the retainer contacting an outer jacket of the ADSS cable.

18. The optical connector assembly of claim 15, wherein opposing protrusions extending into the interior channel, the opposing protrusions dividing the interior channel into a first portion and a second portion, wherein strength fibers and a strength member of the ADSS cable terminate in the first portion and buffer tubes of the ADSS cable terminate in the second portion.

19. The optical connector assembly of claim 15, wherein a stop extends into the interior channel, and wherein an outer jacket of the ADSS cable contacts and terminates at the stop.

20. The optical connector assembly of claim 15, wherein the main body further defines a pocket.

21. The optical connector assembly of claim 15, wherein an adhesive is disposed within the main body and the connector body, the adhesive contacting the ADSS cable.

22. The optical connector assembly of claim 21, wherein the adhesive has a viscosity of between 400 and 900 cP at 25° C.

23. The optical connector assembly of claim 15, wherein the ADSS cable connector further comprises a boot, the boot connected to the main body.

* * * * *